No. 749,481. PATENTED JAN. 12, 1904.
M. GALLY.
TELEPHONIC REPEATER.
APPLICATION FILED APR. 18, 1903.
NO MODEL.
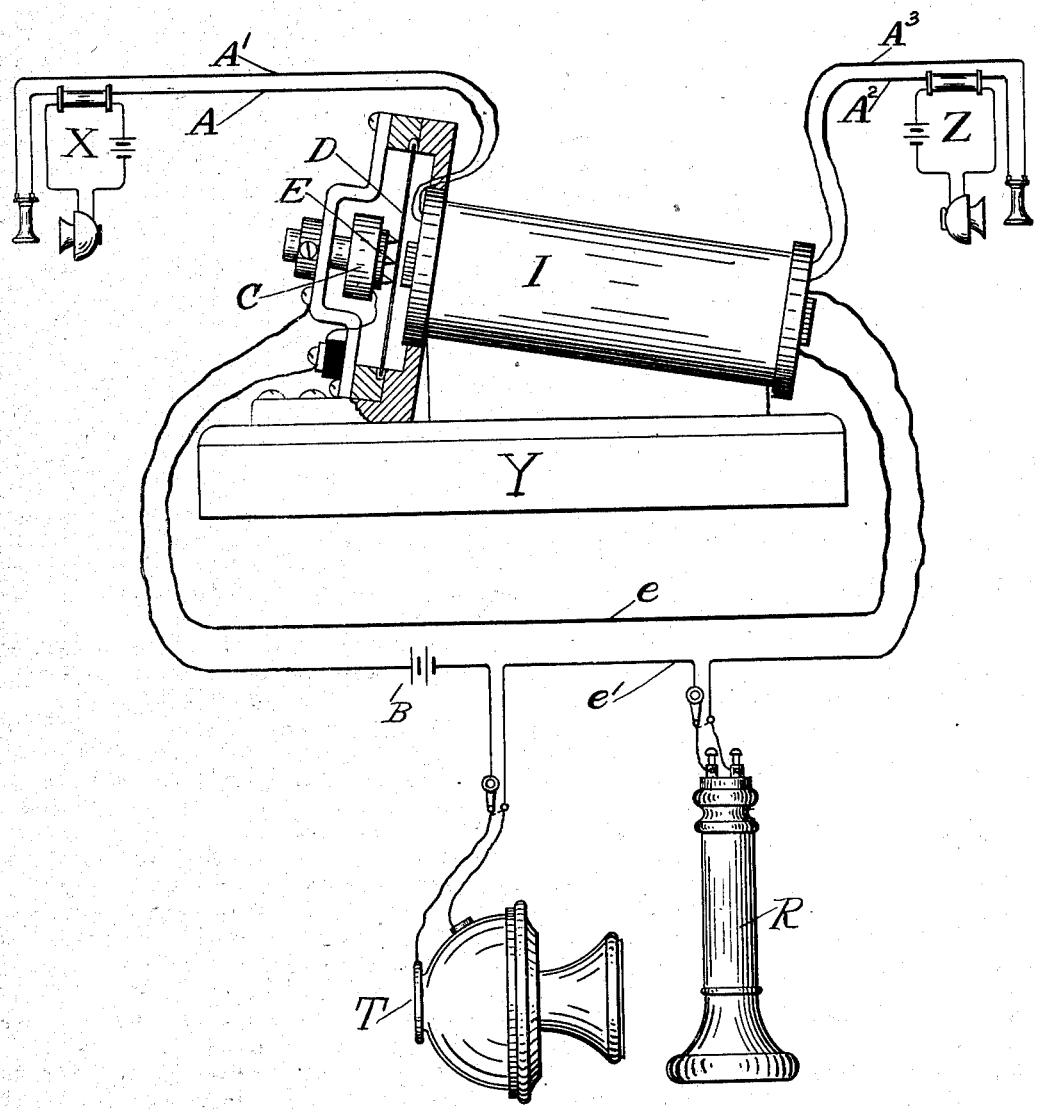

No. 749,481. Patented January 12, 1904.

UNITED STATES PATENT OFFICE.

MERRITT GALLY, OF BROOKLYN, NEW YORK.

TELEPHONIC REPEATER.

SPECIFICATION forming part of Letters Patent No. 749,481, dated January 12, 1904.

Application filed April 18, 1903. Serial No. 153,157. (No model.)

*To all whom it may concern:*

Be it known that I, MERRITT GALLY, a citizen of the United States, and a resident of Brooklyn, in the county of Kings and State of New York, have invented certain new and useful Improvements in Telephonic Repeaters, of which the following is a specification.

On March 18, 1903, I filed an application for patent for a telephonic repeater, Serial No. 148,368, in which I described the receiving part of the repeater as having a doubly-wound magnet-coil, one of the wires of the coil connecting with one main line and the other wire of the coil connecting with another main line. I showed in a primary circuit connected with the transmitting part of the repeater a battery and two induction-coils, one of the induction-coils having its secondary wire in one of the main lines and the other induction-coil having its secondary wire in the other main line. I also stated that the two induction-coils might be in one by winding the secondary double and connecting one of the wires with the one main line and the other wire with the other main line. I also showed the same in dotted lines, leaving it, however, to be claimed in another specification.

In the present case I make a combination of the receiving magnet-coils and the secondary wires of the doubly-wound induction-coil.

In the drawing, I is the induction-coil for the repeating transmitting-circuit. The coil has one winding in the primary, which is in the battery-circuit $e$ $e'$ with battery B. The circuit is connected with the transmitting part of the repeater. It has the ordinary core of soft-iron wires; but as it is in an electric circuit it is constantly magnetic and can serve the purpose of a permanent magnet for the receiving part of the repeater. The double winding of the secondary wires of the induction-coil can also serve as the coils for the receiving part of the repeater. I therefore combine the receiving-magnet of the repeater and the repeater-transmitting induction-coils in one, as shown at I.

As to the receiving part of the repeater, the compound coil I acts as a receiving-magnet operating the receiving-diaphragm. The compound coil I also acts as a compound induction-coil for transmitting from the primary circuit of the repeater to the main lines. The two wires of the secondary of the induction-coil connect one with one of the main lines and the other with the other main line.

The core of the induction-coil being continually magnetic operates on the diaphragm D in the same manner as the ordinary permanent receiving-magnet. The vibrations of the receiving-diaphragm D operate the transmitter connected therewith, transmitting into the other main line.

The transmitting part of the repeater, as shown, is an ordinary carbon granular microphone, having the cup C for the granules and the button-electrode E, which button is provided with three small projections touching the diaphragm D. If the repeating transmitting device is omitted except the diaphragm and the battery-circuit is closed, then the magnet I, with its combination-coils and diaphragm D and electric circuit $e$ $e'$, will act as a magneto-transmitter, transmitting from one main line to the other.

The core of the combined receiving-magnet and transmitting induction-coil is preferably made of a bundle of soft-iron wires.

A local transmitter T may be placed in circuit $e$ $e'$ to transmit to either or both main lines. The receiver R may also be placed in the same circuit or placed in a loop to connect to either of the main lines at will.

In case the repeater is used with magneto-transmitting device if a permanent magnet is used in connection with or forming a part of the receiving-magnet core the battery may be used or not, as desired.

The coil I of the drawing is shown placed on an incline. This is only to make it in line at right angles to the line of the plane of the diaphragm. The diaphragm is inclined from a vertical line to cause the button-electrode E to rest against the diaphragm by its own gravity. Besides, this position of the transmitting part of the repeater is the best for the proper operation of the carbon granules in cup C.

What I claim as my invention, and desire to secure by Letters Patent, is—

1. In a telephonic repeater; a compound receiving and transmitting magnet, comprising a magnet-core with two receiving-wires wound together thereon, the two receiving-wires having connections for connecting separately to two main lines.

2. In a telephonic repeater; a compound receiving and transmitting magnet comprising two receiving-coils, with connections for two main lines; a magnet-core; and a diaphragm arranged in combination with the core of the magnet, to add magneto-electric energy to the induction of the coils for secondary transmission.

3. In a telephonic repeater; a compound receiving and transmitting coil, comprising two wires wound together, with connections for two telephone main lines; one of the wires for one of the main lines, and the other wire for the other main line.

4. In a telephonic repeater; connections for two telephone-lines; a receiving-magnet, having two coils thereon, one of the two coils to connect with one of the two telephone-lines, and the other coil to connect with the other of the two telephone-lines; one of the coils acting as primary, to the other as secondary repeating-coil; and vice versa.

5. A telephonic repeater comprising connections for two telephone-lines; one receiving-magnet having two receiving-coils wound thereon, the two acting together as repeating-coils; one of the coils to connect with one telephone-line, and the other coil to connect with the other telephone-line; and one primary coil to act as primary to both of the receiving-coils in operating as secondary induction-coils.

6. A telephonic repeater, comprising connections for two telephone-lines; one receiving-magnet having two receiving-coils wound thereon, the two coils acting together as repeating-coils; one of the coils to connect with one telephone-line, and the other coil to connect with the other telephone-line; one primary coil to act as primary to both of the receiving-coils in their operations as secondary induction-coils; and a single diaphragm.

7. A telephonic repeater, comprising connections for two telephone-lines; one receiving-magnet having two receiving-coils wound thereon, the two coils acting together as repeating-coils; one of the coils to connect with one telephone-line, and the other coil to connect with the other telephone-line; a diaphragm; one primary coil in local magneto-electric circuit, to act as primary to both of the receiving-coils in their operations as secondary induction-coils.

8. A telephonic repeater, comprising connections for two telephone-lines; one receiving-magnet, having two receiving-coils wound thereon; the two coils acting together as repeating-coils; one of the coils to connect with one telephone-line, and the other coil to connect with the other telephone-line; one primary coil, to act as primary to both of the receiving-coils in their operations as secondary induction-coils; a diaphragm; and a single transmitting device.

9. A telephonic repeater, comprising connections for two telephone-lines; one receiving-magnet, having two receiving-coils wound thereon; the two coils acting together as repeating-coils; one of the coils to connect with one telephone-line, and the other coil to connect with the other telephone-line; one primary coil, to act as primary to both of the receiving-coils in their operations as secondary induction-coils; and a single diaphragm with a transmitting device in local battery-circuit.

MERRITT GALLY.

Witnesses:
 G. POTTER,
 D. B. GALLY.